United States Patent [19]

Heaslip

[11] Patent Number: 5,316,678

[45] Date of Patent: May 31, 1994

[54] FILTER CELL SEAL ASSEMBLY

[75] Inventor: Herbert F. Heaslip, Cottekill, N.Y.

[73] Assignee: Stavo Industries, Inc., Kingston, N.Y.

[21] Appl. No.: 882,416

[22] Filed: May 13, 1992

[51] Int. Cl.$^5$ .............................................. B01D 29/39
[52] U.S. Cl. ................................ 210/486; 210/489; 210/497.2
[58] Field of Search ............... 210/445, 483, 484, 486, 210/488, 489, 497.01, 497.2

[56] References Cited

U.S. PATENT DOCUMENTS

| | | | |
|---|---|---|---|
| 2,435,115 | 11/1943 | Alsop | 210/347 |
| 2,788,901 | 10/1954 | Boeddinghaus et al. | |
| 3,082,587 | 2/1960 | Brimberg | |
| 3,932,153 | 1/1976 | Byrns | 210/445 |
| 4,007,114 | 2/1977 | Ostreicher | 210/638 |
| 4,148,732 | 4/1979 | Burron et al. | 210/445 |
| 4,193,876 | 3/1980 | Leeke et al. | 210/489 |
| 4,225,440 | 9/1980 | Pitesky | 210/445 |
| 4,347,208 | 8/1982 | Southall | |
| 4,631,685 | 12/1986 | Peter | |
| 4,783,262 | 11/1988 | Ostreicher et al. | |
| 4,828,694 | 5/1989 | Leason | 210/445 |
| 5,011,555 | 4/1991 | Sager | 210/445 |
| 5,147,545 | 9/1992 | Despard et al. | 210/450 |

Primary Examiner—Matthew O. Savage
Assistant Examiner—W. L. Walker
Attorney, Agent, or Firm—Jacobson, Price, Holman & Stern

[57] ABSTRACT

An improved filter cell is formed by sealing at least two layers of filter media with an interposed drainage support member between two identical edge seal rings. A flexible radial edge is produced that will not crack during its lifetime, including during manufacture, shipping and use. The edge seal rings and the drainage or support member are preferably formed of food grade polypropylene. The molten polypropylene formed by the friction welding of the two edge seal rings with respect to each other fills two cavities formed between the two edge seal rings to firmly secure two filter media disc covers around the entire periphery of the edge seal rings. Each edge seal ring is formed of an annular member having an annular ridge with a pointed terminal portion for engaging the opposed filter media disc cover to aid in retention of the filter media disc covers and drainage member between the edge seal rings. Molten polypropylene seals any gaps between the two edge seal rings to prevent lateral filtrate flow through the filter cell during use.

10 Claims, 1 Drawing Sheet

FILTER CELL SEAL ASSEMBLY

FIELD OF THE INVENTION

The present invention relates to an edge seal ring for a filter cell. At least two filter media disc covers having an interposed drainage member, are secured between two identical edge seal rings to form a filter cell. A friction welder is used to secure the two edge seal rings together to engage the filter media disc covers. A plurality of filter cells are joined together to form a disc cartridge.

BACKGROUND OF THE INVENTION

Filtering units consisting of centrally apertured plates or discs of fibrous substances are known from U.S. Pat. No. 2,435,115 to Alsop. The units are stacked coaxially and connected together.

In U.S. Pat. No. 4,347,208 to Southall, a method is disclosed for making a filter cell having two cellulosic fiber containing filter media with a sealed periphery. The peripheries of the filter media are compressed to form a flange. The filter media is then placed in a mold which surrounds the flanges. A thermoplastic polymer is then injected into the mold to form a seal around the flanges.

Additional examples of filter cells are disclosed in U.S. Pat. No. 2,788,901 to Boeddinghaus et al, U.S. Pat. No. 3,082,587 to Brimberg and U.S. Pat. No. 4,783,262 to Ostreicher et al.

SUMMARY OF THE INVENTION

By the present invention, an improved filter cell is formed by sealing at least two layers of filter media with an interposed drainage or support member, between two edge seal rings. A flexible radial edge is produced that will not crack during its lifetime, including during manufacture, shipping and use. The edge seal rings are welded together by a friction welding procedure.

The edge seal rings and the drainage or support member are preferably formed of food grade polypropylene although other compatible materials are acceptable. The molten polypropylene formed by the friction welding of the two edge seal rings with respect to each other fills two cavities formed between the two edge seal rings to firmly secure two filter media disc covers around the entire periphery of the edge seal rings.

The edge seal ring is formed of an annular member having an annular ridge with a pointed terminal portion for engaging the opposed filter media disc covers to aid in retention of the filter media disc covers and drainage member between the edge seal rings. Molten polypropylene seals any gaps between the two edge seal rings to prevent lateral filtrate flow through the filter cell during use.

In the edge seal ring prior to friction welding, the annular ridge having a pointed terminal portion forms the radially innermost ridge of the edge seal ring. A radially outermost ridge forms an outermost edge of the filter cell formed by two fused edge seal rings. A friction welding surface ridge located between the radially outermost and radially innermost ridges of the edge seal ring has a height greater than that of the radially outermost ridge.

During the friction welding procedure, the ultimate goal is to join and permanently attach two or more plastic components. The weld is achieved by creating molten plastic at the weld point and then allowing the material to cool and consolidate.

Friction welding creates heat by applying pressure to the parts to be joined at the welding surface and rapidly moving one component against the other fixed component. Once sufficient molten material has been generated, the motion is halted. The components are aligned and allowed to cool, thus creating the finished weld joint.

Friction welding is the preferred method to join the edge seal rings for three important reasons:

(1) This process allows greater versatility in the choice of materials that can be welded. Polypropylene is one of the materials of choice for the edge seal ring. Polypropylene is not easily welded employing other processes.

(2) Friction welding allows each edge seal ring to be identical. Other welding methods require the use of male and female parts to achieve a welded joint. Such parts require a different mold to produce each part during the injection molding process employed to manufacture the edge seal rings. This greatly increases the cost of equipment needed to manufacture an edge seal ring and ultimately increases the cost of a finished cell assembly.

(3) The size and configuration of the edge seal ring assembly does not easily permit the use of other welding methods.

One advantage of friction welding versus other methods is the versatility of filter media to which a plastic edge may be applied. Current injection molding methods limit the types of filter media that may have a plastic edge applied due to the temperature of the molten plastic during the molding process, Certain filter media, such as polypropylene felt, will melt when exposed to these temperatures. The friction welding process permits the application of a plastic edge to such filter media because of the absence of high temperatures at the clamping area of the edge ring.

Another advantage is greater control of the amount of impingement on filter media due to the various welding parameters which may be controlled during the welding process. Finished weld height or the actual amount of weld melt may be independently controlled which will allow for greater versatility in the thickness of various filter media to be used in the welded cell.

Other advantages are no internal migration of polypropylene "flash" from edge area, no precompression (pretreatment) of filter media is necessary before application of sealing rings, reduced cost of equipment for production phase of edge seal and reduced cost of labor and skill level required to assemble a cell unit.

It is an object of the present invention to provide a first edge seal ring having three ridges, which when mated with a second edge seal ring identical to the first edge seal ring, secures two filter media disc covers between the two edge seal rings with a drainage member interposed between the filter media disc covers.

It is another object of the present invention to provide a first edge seal ring having three ridges, which when mated with a second edge seal ring identical to the first edge seal ring, secures two filter media disc covers between the two edge seal rings with a drainage member interposed between the filter media disc covers, with a radially innermost ridge having a pointed terminal portion, a radially outermost ridge forming an outermost edge of a formed filter cell and a friction welding surface ridge located between the radially outermost and radially innermost ridges, having a height greater than that of the other two ridges.

It is still another object of the present invention to provide a first edge seal ring having three ridges, which when mated with a second edge seal ring identical to the first edge seal ring, secures two filter media disc covers between the two edge seal rings with a drainage member interposed between the filter media disc covers, with a radially innermost ridge having a pointed terminal portion, a radially outermost ridge forming an outermost edge of a formed filter cell and a friction welding surface ridge located between the radially outermost and radially innermost ridges, having a height greater than that of the other two ridges, with the two edge seal rings being secured to each other by a friction welding procedure.

It is still yet another object of the present invention to provide a first edge seal ring having three ridges, which when mated with a second edge seal ring identical to the first edge seal ring secures two filter media disc covers between the two edge seal rings with a drainage member interposed between the filter media disc covers, and with a radially innermost ridge having a pointed terminal portion, a radially outermost ridge forming an outermost edge of a formed filter cell and a friction welding surface ridge located between the radially outermost and radially innermost ridges, having a height greater than that of the other two ridges, with the two edge seal rings being secured to each other by a friction welding procedure, and with the friction welding surface ridge melting to fill two cavities located on opposite sides of the friction welding surface ridges as formed between the two edge seal rings to firmly secure two filter media disc covers between the two edge seal rings.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
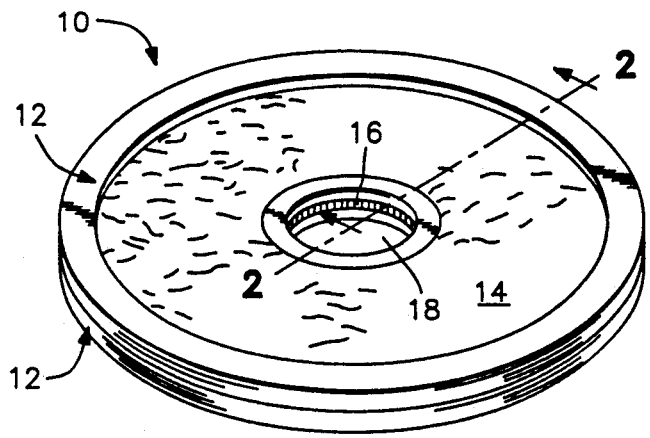
FIG. 1 is a perspective view of a filter cell.

In describing the preferred embodiments of the invention illustrated in the drawings, specific terminology will be resorted to for the sake of clarity. However, the invention is not intended to be limited to the specific terms so selected, and it is to be understood that each specific terms includes all technical equivalents which operate in a similar manner to accomplish a similar purpose.

With reference to the drawings, in general, and to FIG. 1, in particular, a filter cell embodying the teachings of the subject invention is generally designated as 10. The filter cell 10 is formed by two opposed edge seal rings 12 which are identical. Secured between the two edge seal rings are two filter media disc covers 14. A drainage material member 16 is located between the two filter media disc covers. The filter media disc covers are made of polypropylene felt, cellulose discs or other permeable material. The drainage or support member is formed in a grid structure and is made of food grade polypropylene.

The filter media disc covers and drainage material member 16 have centrally located, aligned openings 18 for use in forming a filter disc cartridge. The openings 18 also serve as an outlet discharge of the filter.

Figure 3:
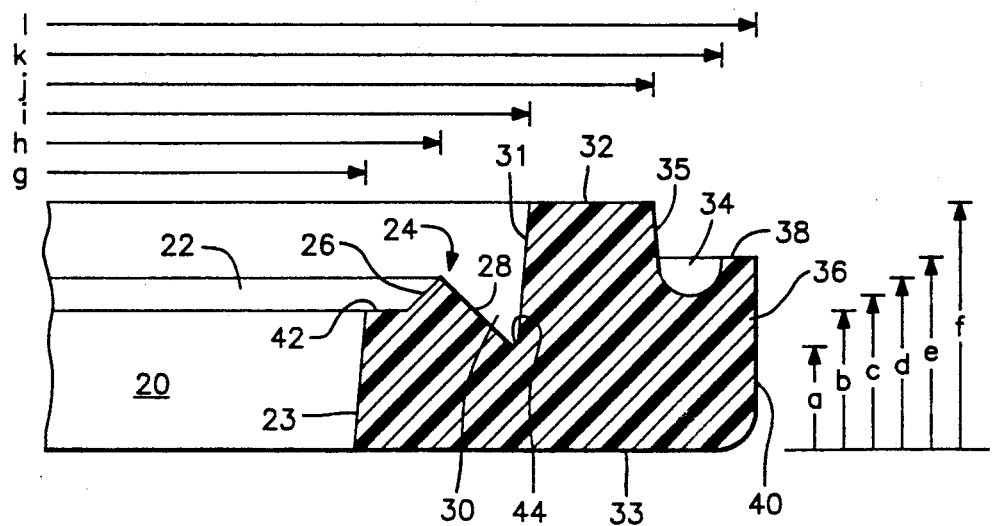
FIG. 3 is a sectional view of an edge seal ring, prior to welding to an opposed edge seal ring to form a filter cell.

Prior to joining of two opposed edge seal rings 12, each edge seal ring appears as shown in FIG. 3. The edge seal ring is formed of an annular member 20. Proceeding in a radially outward direction from a center of the ring, the annular member 20 includes ridge 22 having a pointed terminal portion 24. The sides 26, 28 of the terminal portion 24 are formed at an angle of 90° with respect to each other. A radially inner side wall 23 of member 20 is inclined at an angle of 7° to the vertical.

Stepping radially outwardly is next formed a cavity 30 for receipt of molten material, as will be explained in greater detail later. Cavity 30 includes a side wall 31 which meets side 28 to form a curved portion 33 at the base of the cavity 30. Side wall 31 is formed at an angle of 5° to the vertical.

The next radially outermost portion of the annular member 20 is a friction welding surface ridge 32. Next is formed cavity 34 having side wall 35, inclined at an angle of 2.5° to the vertical. Finally, outermost radial ridge 36 includes flat surface 38. Formed perpendicular to surface 38 is side surface 40 which forms the radially outermost surface when a filter cell is formed.

An example only, of dimensions for one particular filter cell according to the present invention includes an edge seal ring 12 formed of an annular member 20 having an approximate thickness "b"=0.100 (±0.010) inches between surface 42 and surface 44. The distance "a" between the bottom surface of cavity 30 to surface 44 is equal to approximately 0.080 inches. The distance "c" between the bottom of cavity 34 to surface 44 is equal to approximately 0.117 (±0.005) inches. The distance "d" from the top point of terminal portion 24 to side surface 44 is equal to approximately 0.125 (±0.010) inches. The distance "e" from surface 38 to surface 44 is equal to approximately 0.147 (±0.005) inches. The width "f" of the annular member 20 from the upper surface of ridge 32 to side surface 44 is equal to approximately 0.187 (±0.005) inches.

The radical measurements for the various surfaces of the annular member 20 as represented by "g" through "l" are g=5.220 (±0.010) inches, h=5.282 (±0.010) inches, i=5.345 (±0.010) inches, j=5.457 (±0.010) inches, k=5.507 (±0.010) inches, and l=5.533 inches. All measurements are approximate and are but a single example of the many possible diameter filter cells used to form a disc cartridge.

To form a filter cell, a cover 14 is placed into an inside surface of a first edge seal ring. The drainage or support member 16 is placed on top of the first cover 14. As noted from FIG. 2, with aligned openings 18 for the cover 14 and support member 16, the support member is of a lesser diameter than the cover 14. Therefore, the support member is held between two covers, but does not extend to the edge seal rings.

The second cover 14 is placed on the stack above the drainage or support member. An inner surface of a second edge seal ring 12 is placed on top of the second cover. The second edge seal ring is identical to the first edge seal ring.

Figure 2:
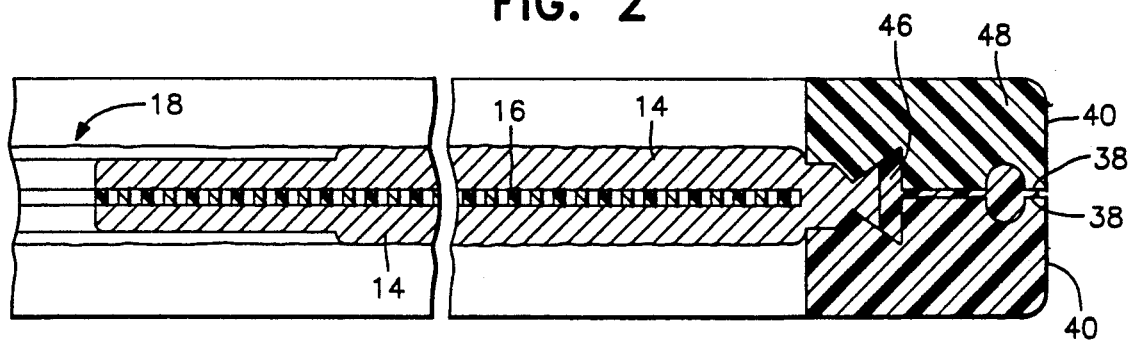
FIG. 2 is a sectional view taken along line 2—2 of FIG. 1.

The entire assembly is aligned and loaded into a friction welder. The drainage or support member 16 is interposed between the two filter media disc covers 14 so that terminal portion 24 of ridge 22 impinges o the outer surfaces of the filter media disc covers as shown in FIG. 2. Pressure is applied to compress the assembly and to expose the friction welding surface ridges to each other. The welding surface ridges each melt approximately 0.040 inches to approximate the height of ridge 36. The melted polypropylene flows into the cavities 30 and 34 formed between two edge seal rings 12 as shown by filled cavities 46 and 48, shown in FIG. 2 so that molten polypropylene fills the cavities 46, 48 to seal the opposed edge seal rings together permanently.

In cavity 46, the molten material of the two edge seal rings, preferably polypropylene, also contacts and secures an edge of the two filter media disc covers 14. The drainage or support member 16 is held interposed between the two filter media disc covers.

Preferably, the molten polypropylene fills any space between surfaces 38 to a point short of side wall 40 to avoid the migration of any molten polypropylene ("flash") beyond the radially outermost ridges 36 so as to avoid the requirement for additional finishing of the filter cell after assembly.

A plurality of assembled filter cells may then be joined to form a cell cartridge.

Having described the invention, many modifications thereto will become apparent to those skilled in the art to which it pertains without deviation from the spirit of the invention as defined by the scope of the appended claims.

I claim:
1. A filter cell comprising:
   two identical edge seal rings,
   at least two filter media disc covers located between said two edge seal rings with a support member interposed between said at least two filter media disc covers,
   each edge seal ring including a radially innermost ridge, a radially outermost ridge and a central ridge located between said radially innermost ridge and said radially outermost ridge, said respective central ridges being welded to each other to secure said two filter media cell covers between said two edge seal rings.
2. An edge seal ring for a filter cell as claimed in claim 1, wherein a terminal portion of said radially innermost ridges includes a point for impinging on said two filter media disc covers to secure said filter media disc covers in place.
3. An edge seal ring for a filter cell as claimed in claim 1, wherein said two edge seal rings are made of polypropylene.
4. An edge seal ring for a filter cell as claimed in claim 1, wherein said two filter media disc covers extend into a cavity located between said radially innermost ridge and said central ridge, said cavity being filled with melted material from said central ridge for securing said two filter media disc covers in place.
5. A filter cell comprising:
   two identical edge seal rings, each edge seal ring including a first ridge located at a radially outermost position and a second ridge located radially inwardly from said first ridge, said second ridge of each edge seal ring extending to a first height,
   filter media located between said two edge seal rings,
   said two edge seal rings, after said two edge seal rings are welded together, results in said second ridge of each edge seal ring extending to a second height less than said first height to secure said filter media between said two edge seal rings.
6. A filter cell as claimed in claim 5, wherein said two edge seal rings are made of polypropylene.
7. A filter cell as claimed in claim 5, wherein said filter media extends adjacent to said second ridge and is secured in place with melted material from said second ridge when said second ridge of each edge seal ring is welded.
8. A filter cell comprising:
   two identical edge seal rings, each edge seal ring including an annular ridge extending to a first height,
   filter media located between said two edge seal rings,
   said two edge seal rings, after said two edge seal rings are welded together, results in said annular ridge of each edge seal ring extending to a second height less than said first height to secure said filter media between said two edge seal rings.
9. A filter cell as claimed in claim 8, wherein said two edge seal rings are made of polypropylene.
10. A filter cell as claim 8, wherein said filter media extends adjacent to said annular ridge and is secured in place with melted material from said annular ridge when said annular ridge of each edge seal ring is welded.

* * * * *